Sept. 15, 1942.   C. KING   2,295,850
TRACTOR EXCAVATOR
Filed April 3, 1941   3 Sheets-Sheet 1

Inventor
CARL KING
By Clarence A. O'Brien
Attorney

Sept. 15, 1942.  C. KING  2,295,850
TRACTOR EXCAVATOR
Filed April 3, 1941  3 Sheets-Sheet 3

Inventor
CARL KING
By Clarence A. O'Brien
Attorney

Patented Sept. 15, 1942

2,295,850

UNITED STATES PATENT OFFICE 2,295,850

TRACTOR EXCAVATOR

Carl King, Ballston Spa, N. Y.

Application April 3, 1941, Serial No. 386,725

2 Claims. (Cl. 37—126)

This invention relates to excavating implements of the type used in connection with tractors for cellar excavating, road work and the like; and an object of the present invention is to provire an excavator attachment for a tractor which can be readily and easily manipulated by the operator of the tractor; will have a good cutting operation; and will be so proportioned in length with respect to the over-all width of the tractor or other draft vehicle to permit excavation being carried on close to the cellar or simial wall structure thereby reducing to a minimum manual labor in completing the excavating operation.

The invention together with its objects and advantages will be best understood from a study of the following description taken in connection with the accompanying drawings wherein:

Figure 4 is an enlarged detail view partly in section and partly in elevation illustrating certain details hereinafter more fully referred to.

Figure 1:
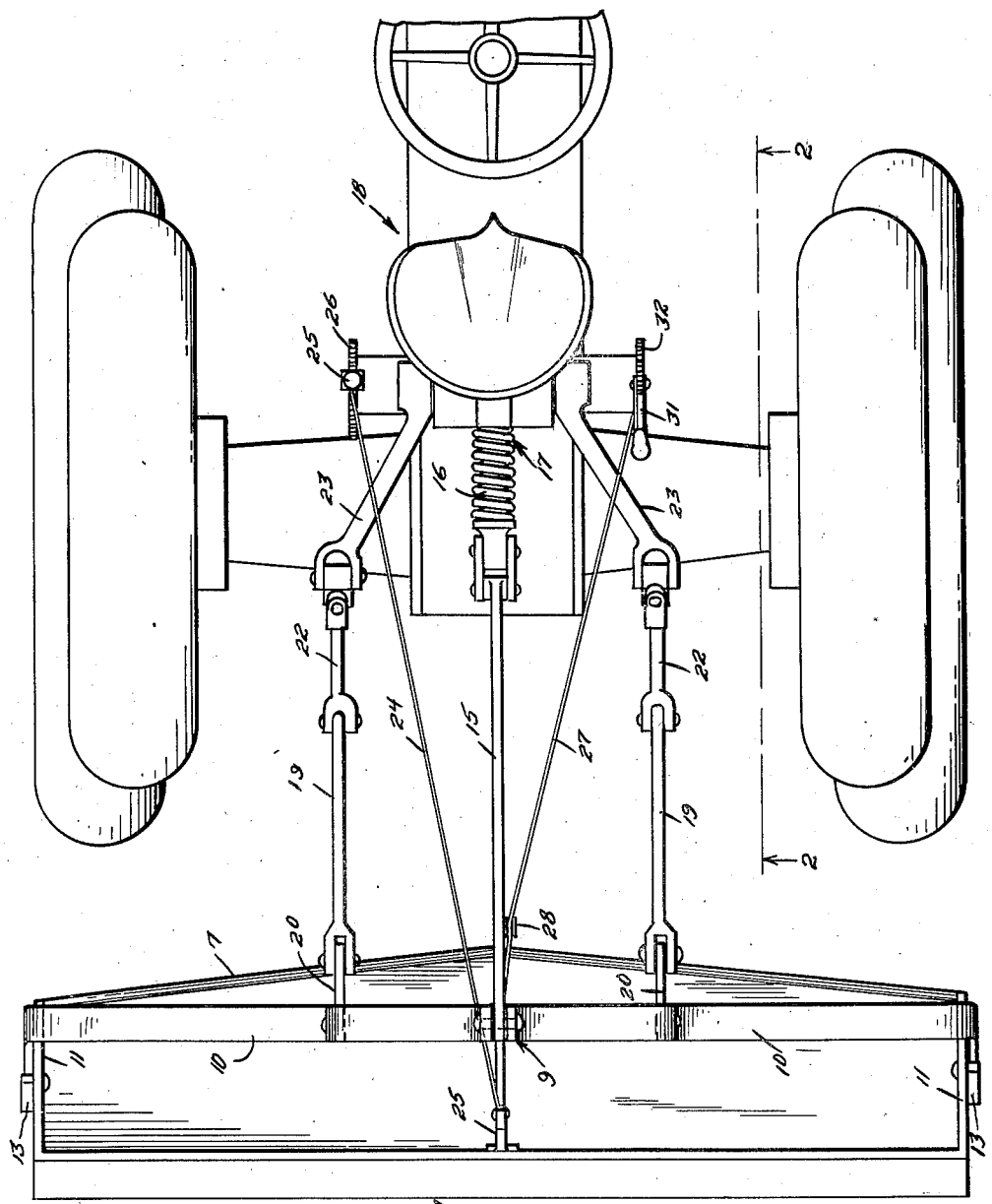
Figure 1 is a top plan view of the excavator implement hitched to a tractor, the same being shown fragmentarily and in top plan.

Referring more in detail to the drawings it will be seen that the excavator attachment embodies a shovel together with means for connecting the same with the tractor, and also with the hydraulic lift of the tractor so that the implement will be drawn by the tractor and the hydraulic lift thereof utilized for raising and lowering the bucket of the implement into and out of earth-working position.

In the preferred embodiment thereof, the bucket 5 is characterized by having the bottom 6 thereof at the open side of the bucket feathered to a cutting edge 7; and also by having said bottom uniformly increasing in width inwardly from opposite ends of the bucket to the transverse median of the bucket bottom to provide at said forward cutting edge 7 a point 8 to facilitate and initiate the cutting action of the bottom of the bucket in the use of the same for excavating purposes.

For the bucket 5 there is provided a bail 9 composed of two complemental angular sections 10 which at one end are pivoted to the end walls 11 of the bucket as at 12.

On the end walls 11 thereof the bucket is provided with properly positioned stops 13, 13' to limit swinging movement of the bucket in either of two directions on its pivot 12.

At the free ends thereof the members 10 of the bail 9 are pivoted as at 14 to one end of a link 15 that serves to connect the bail with the part 16 of the conventional hydraulic lift assembly 17 with which the tractor, indicated generally by the reference numeral 18, is equipped as is conventional.

Stabilizing rods 19 are pivoted at one end thereof to bracket plates 20 provided on the members 10 of the bail 9 at about the angle between the substantially horizontal portions and vertical portions of the members 10 of the bail, while at their opposite ends the stabilizing rods 19 are pivoted to the axle housing of the tractor as at 21.

Intermediate their ends the stabilizing rods 19 are connected through the medium of links 22 with crank arms 23 forming part of the hydraulic lift assembly 17 as shown.

For tilting the bucket 5 forwardly to initiate the digging action thereof, and also to control the angle at which the bucket will perform the digging operation, there is provided a cable 24 that at one end is suitably connected with a short post attachment 25 rising from the back of the bucket 5, and at an opposite end is suitably connected to a hand lever 25 pivotally mounted on the tractor at one side of the driver's seat as shown. The lever 25 is equipped with a suitable detent cooperable with a rack segment 26 for securing the lever 25 at the desired position of adjustment, and consequently the bucket 5 at the desired angle of inclination.

Also to facilitate rocking the bucket, and particularly for raising the digging edge 6 thereof so as to position the bucket when carrying a full load as to prevent the contents of the bucket spilling therefrom, there is provided a cable 27 that has an intermediate portion thereof trained over a pulley 28, and one end secured as at 29 to the forward upper corner of the divider plate or partition 30 rising from the bottom 6 of the bucket, and an opposite end connected to a hand lever 31 pivotally mounted on the tractor at that side of the driver's seat opposite to the aforementioned hand lever 25.

Hand lever 31 is also equipped with a suitable detent for cooperation with a rack segment 32 to secure the bucket 5 in a position as will preclude the contents of the bucket from spilling therefrom. In this connection, it will be appreciated that such position of the bucket will be as to have the back and bottom walls of the bucket disposed at an angle to the perpendicular and the angle between the back and bottom walls of the bucket disposed substantially parallel with the ground, it being noted that the bucket is substantially triangular in cross-section, and with the open side disposed upwardly in the manner just suggested, the contents of the bucket will be retained therein against material spilling over.

Figure 2:
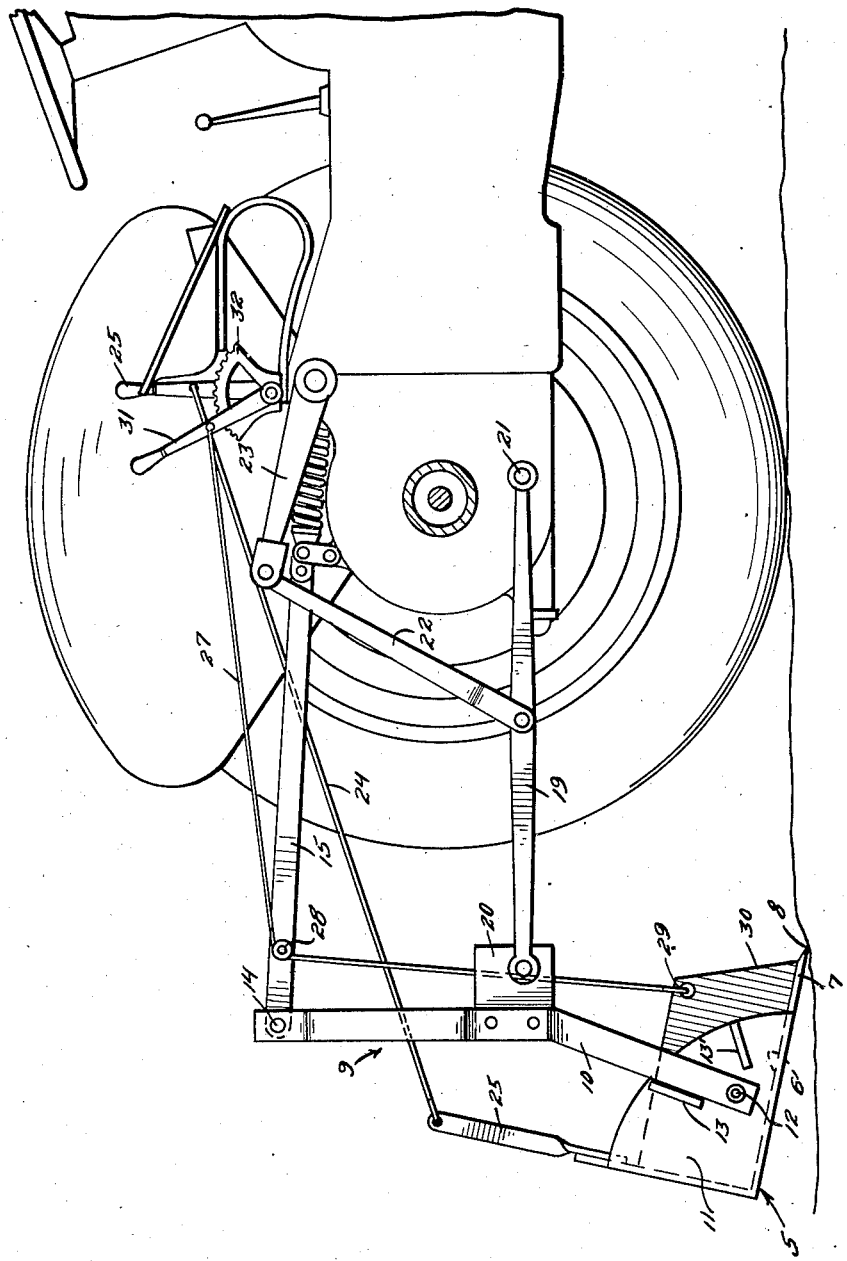
Figure 2 is an enlarged vertical sectional view taken substantially on the line 2—2 of Figure 1.
Figure 3:
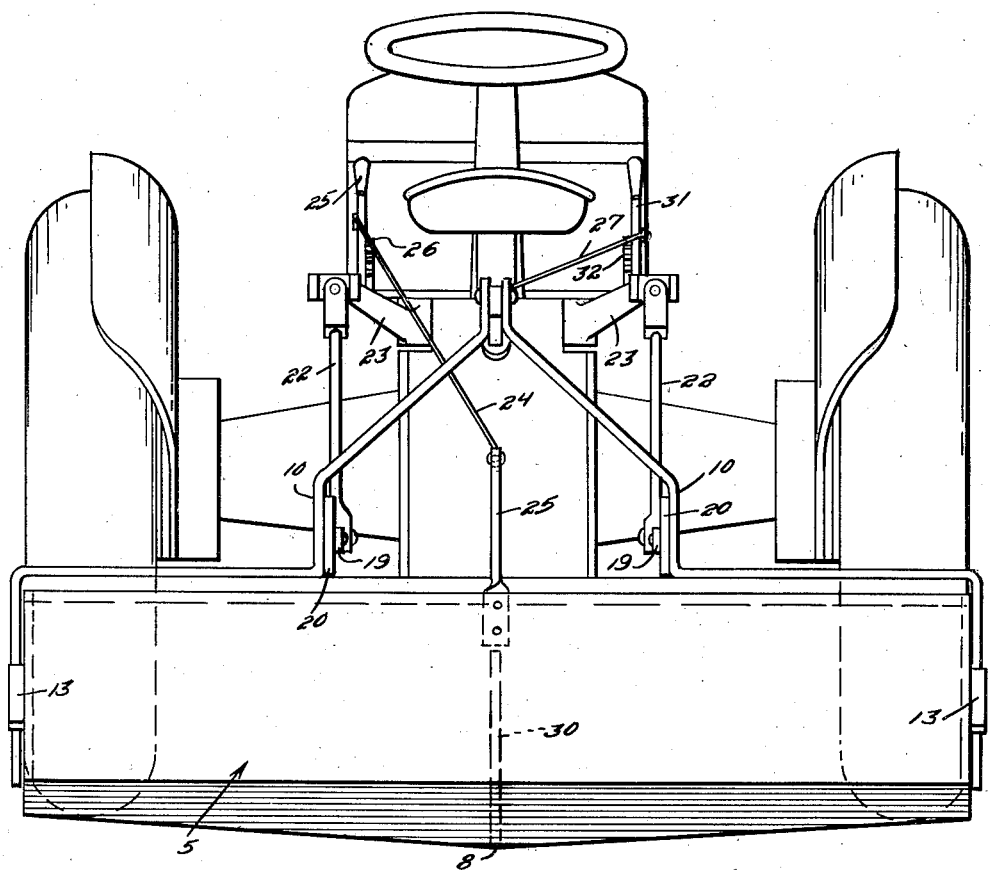
Figure 3 is a rear elevational view of a tractor with the excavating implement hitched thereto.
Figure 4:
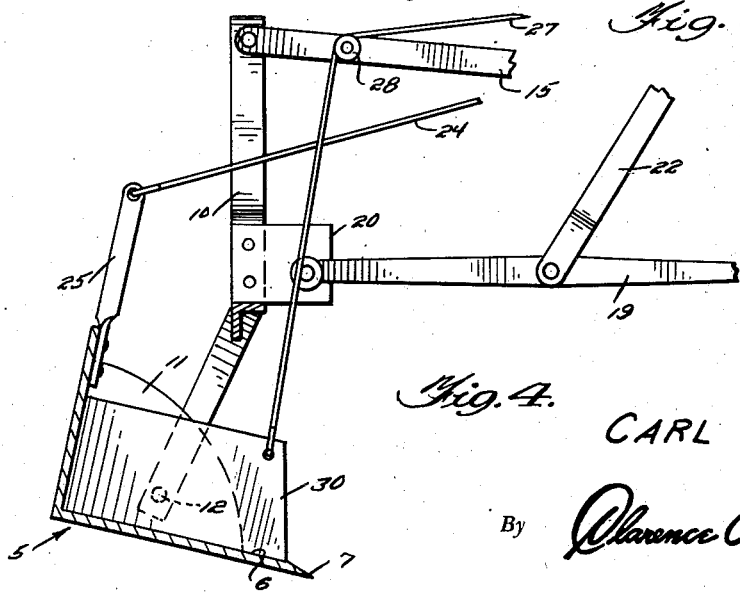

Manifestly when the device is used for excavation work, the shovel 5 is in substantially the position shown in Figure 2 and serves to scoop up the dirt as it trails the tractor 18. After sufficient dirt has been gathered into the bucket, the hydraulic lift mechanism of the tractor is operated to raise the bucket above the ground. The lever 31 may then be manipulated to swing the bucket 5 on its pivots 12 until the stops 13' abut the members 10 of the bail 9, and in which position the bucket is suspended so as to retain the contents thereof against spilling over and being scattered. Thus, with the bucket held in this position, the same may be transported to a distant location, and then released to swing on the pivots 12 to dump the contents thereof.

It is thought that the simplicity of the excavator attachment both from the standpoint of structure and from its manner of attachment to the tractor or other draft vehicle, as well as the many other advantages of an excavator attachment for tractors embodying the features of the present invention will be all clear to those skilled in the art without further detailed description.

It is also to be understood that I do not wish to limit myself to the precise details of construction, combination and arrangement of elements as herein described, since changes may be made therein by persons skilled in the art.

Having thus described the invention what is claimed as new is:

1. An excavating attachment for a tractor equipped with an hydraulic lift mechanism, comprising a digging and collecting bucket having a bail pivoted thereto, means for operatively connecting the bail of the bucket to the hydraulic lift mechanism of the tractor, manually manipulated means for swinging the bucket relative to the bail to control the digging angle of the bucket including means for securing the bucket at the desired digging angle, and other manually manipulative means connected with the bucket for swinging the bucket on its pivots relative to the bail to position the bucket for retaining the contents thereof, and including means for securing the bucket in the last-named position; opposed pairs of stop elements on opposite ends of the bucket in the region of the pivotal connections between the bucket and the bail for abutment with the bail to limit pivotal movement of the bucket in either of two directions relative to the bail.

2. In an excavating attachment for draft vehicles, a digging and collecting bucket embodying a bottom wall progressively increasing in width inwardly from opposite ends of the bucket to provide at the forward edge of said wall, and intermediate the ends thereof a forwardly extending digging point, said bottom at said forward edge being feathered to provide a cutting edge, a partition plate rising from said bottom wall in substantial alignment with the aforementioned digging point and extending from the back wall of the bucket to substantially the extremity of said digging point, a bail for the bucket having legs pivoted to opposite end walls of the bucket, and pairs of lugs mounted on the respective end walls of the bucket between which the pivoted ends of the legs of the bail are accommodated and with which said pivoted legs of the bail abut for limiting swinging movement of the bucket relative to the bail in either of two directions, whereby provision is made for suspending the bucket from the bail with the angle between the rear and bottom walls of the bail substantially parallel with the ground and the said rear and bottom walls of the bucket disposed at an angle to the perpendicular whereby the bucket is suspended for retaining the contents thereof.

CARL KING.